United States Patent
Lei et al.

(10) Patent No.: US 12,185,383 B2
(45) Date of Patent: *Dec. 31, 2024

(54) RANDOM ACCESS RESPONSE MAPPING FOR TWO-STEP RANDOM ACCESS CHANNEL PROCEDURE

(71) Applicant: QUALCOMM Incorporated, San Diego, CA (US)

(72) Inventors: Jing Lei, San Diego, CA (US); Muhammad Nazmul Islam, Littleton, MA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,993

(22) Filed: Nov. 15, 2023

(65) Prior Publication Data

US 2024/0090041 A1    Mar. 14, 2024

Related U.S. Application Data

(63) Continuation of application No. 16/948,956, filed on Oct. 7, 2020, now Pat. No. 11,864,235.

(Continued)

(51) Int. Cl.
*H04W 74/0833*  (2024.01)
*H04L 1/1812*  (2023.01)
(Continued)

(52) U.S. Cl.
CPC ....... *H04W 74/0833* (2013.01); *H04L 1/1812* (2013.01); *H04W 72/23* (2023.01); *H04W 74/006* (2013.01); *H04W 76/27* (2018.02)

(58) Field of Classification Search
None
See application file for complete search history.

(56) References Cited

U.S. PATENT DOCUMENTS

2016/0309506 A1   10/2016   Lim et al.
2019/0254074 A1   8/2019   Jeon et al.
(Continued)

FOREIGN PATENT DOCUMENTS

CN     109863817 A     6/2019
JP     2017533658 A    11/2017
(Continued)

OTHER PUBLICATIONS

"3rd Generation Partnership Project, Technical Specification Group Radio Access Network, NR, Medium Access Control (MAC) Protocol Specification (Release 15)", 38321-F70, 3rd Generation Partnership Project (3GPP), Mobile Competence Centre, 650, Route Des Lucioles, F-06921 Sophia-Antipolis Cedex, France, Sep. 27, 2019, XP051799979, pp. 1-77.

(Continued)

*Primary Examiner* — Noel R Beharry
*Assistant Examiner* — Liem H. Nguyen
(74) *Attorney, Agent, or Firm* — Harrity & Harrity, LLP

(57) ABSTRACT

Various aspects of the present disclosure generally relate to wireless communication. In some aspects, a base station (BS) may group and selectively multiplex a plurality of random access channel responses (RARs) and radio resource control (RRC) messages in a message B (msgB) communication, together with supplementary scheduling information for other RARs to be mapped to a different msgB communication. The BS may transmit the msgB communication to one or more user equipments. Numerous other aspects are provided.

30 Claims, 12 Drawing Sheets

Related U.S. Application Data

(60) Provisional application No. 62/912,558, filed on Oct. 8, 2019.

(51) Int. Cl.
  H04W 72/23 (2023.01)
  H04W 74/00 (2009.01)
  H04W 76/27 (2018.01)

(56) References Cited

U.S. PATENT DOCUMENTS

| | | | | |
|---|---|---|---|---|
| 2020/0107371 | A1* | 4/2020 | Kunt | H04W 74/0833 |
| 2021/0051726 | A1 | 2/2021 | Xu et al. | |
| 2021/0051736 | A1* | 2/2021 | Jeon | H04W 76/11 |
| 2021/0105824 | A1 | 4/2021 | Lei et al. | |
| 2022/0061101 | A1 | 2/2022 | Wu et al. | |
| 2022/0070938 | A1* | 3/2022 | Wu | H04L 5/0055 |
| 2022/0078856 | A1 | 3/2022 | Jeon et al. | |
| 2022/0104275 | A1 | 3/2022 | Bao et al. | |
| 2022/0124816 | A1 | 4/2022 | Farag et al. | |
| 2022/0141882 | A1* | 5/2022 | Xu | H04W 76/11 |
| | | | | 370/329 |
| 2022/0141883 | A1* | 5/2022 | Lee | H04W 56/0045 |
| | | | | 370/329 |
| 2022/0150982 | A1 | 5/2022 | Lee et al. | |
| 2022/0183059 | A1 | 6/2022 | Lee et al. | |
| 2022/0191949 | A1 | 6/2022 | Zhang et al. | |
| 2022/0369376 | A1 | 11/2022 | Lin et al. | |

FOREIGN PATENT DOCUMENTS

| | | | | |
|---|---|---|---|---|
| JP | 2018518089 | A | 7/2018 | |
| WO | WO-2020168469 | A1 * | 8/2020 | H04W 74/0833 |

OTHER PUBLICATIONS

Qualcomm Incorporated: "Report of Email Discussion [107#68] [NR/2-Step RACH]: MAC PDU Format for msgB", 3GPP TSG-RAN WG2 Meeting#107bis, R2-1913403, 3rd Generation Partnership Project, Mobile Competence Centre, 650, Route Des Lucioles, F-06921 Sophia-Antipolis, vol. RAN WG2, No. Chongqing, China, Oct. 14-18, 2019, Oct. 4, 2019, XP051804981, 26 Pages.

Zte, et al., "Remaining Issues of 2-step RACH Procedures", 3GPP Draft, 3GPP TSG RAN WG1 Meeting #98bis, R1-1910003, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14-20, 2019, Oct. 4, 2019, 19 Pages, XP051808066.

"3rd Generation Partnership Project; Technical Specification Group Radio Access Network; NR; Medium Access Control (MAC) Protocol Specification (Release 15)", 3GPP Draft, 38321-F70, 3rd Generation Partnership Project (3GPP), Mobile Competence Centre, 650, Route Des Lucioles, F-06921 Sophia-Antipolis Cedex, France, Sep. 27, 2019 (Sep. 27, 2019), XP051799979, pp. 1-77, section 1 section 5.17.

Ericsson: "Open Issues for MsgB Formats for 2-Step RA", 3GPP Draft, 3GPP TSG-RAN WG2 #107bis, R2-1912678, Open Issues for MsgB Formats for 2-STEP RA, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14-18, 2019, Oct. 3, 2019 (Oct. 3, 2019), XP051803969, 7 pages, the whole document.

Ericsson: "Procedure for Two-Step RACH", 3GPP TSG-RAN WG1 Meeting #98, R1-1910907, Chongqing, China, Oct. 14-18, 2019, Oct. 18, 2019 (Oct. 18, 2019) The Whole Document, pp. 1-18, XP051808739, Retrieved from the Internet: URL: https://ftp.3gpp.org/tsg_ran/WG1_RL1/TSGR1_98b/Docs/R1-1910907.zip. R1-1910907 Procedure for Two-step RACH.docx [retrieved on Oct. 5, 2019].

ETRI: "MsgB Handling for 2-step RACH", 3GPP Draft, 3GPP TSG-RAN WG2 Meeting #107, R2-1908930, MsgB Handling for 2-step RACH, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26-30, 2019, Aug. 14, 2019 (Aug. 14, 2019), XP051766748, 4 pages, the whole document.

International Search Report and Written Opinion—PCT/US2020/054801—ISA/EPO—Dec. 18, 2020.

Qualcomm Incorporated: "Report of Email Discussion [107#68] [NR/2-step RACH]: MAC PDU Format for msgB", 3GPP Draft, 3GPP TSG-RAN WG2 Meeting#107bis, R2-1913403, Report of Email Discussion [107#68] [NR/2-step RACH]: MAC PDU Format for msgB. 3rd Generation Partnership Project, Mobile Competence Centre, 650, Route Des Lucioles, F-06921 Sophia-Antipolis. Vol. RAN WG2, No. Chongqing, China, Oct. 14-18 2019, Oct. 4, 2019, XP051804981, 26 pages, Section 1 section 2.

Zte., et al., "Remaining Issues of 2-step RACH Procedures", 3GPP Draft, 3GPP TSG RAN WG1 Meeting #98bis, R1-1910003, Remaining Issues of 2-step RACH Procedures, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14-20, 2019, Oct. 4, 2019 (Oct. 4, 2019), XP051808066, 19 pages, section 1 section 3.

Lenovo: "Common Control Messages for R13-MTC", 3GPP TSG RAN WG1 Meeting #80bis, R1-151768, Belgrade, Serbia, Apr. 20, 2015-Apr. 24, 2015, Apr. 10, 2015, 5 Pages.

Samsung: "Clarification on UP Path Management Event API", S6-201050, 3rd Generation Partnership Project, Mobile Competence Centre, 650, Route Des Lucioles, F-06921 Sophia-Antipolis Cedex, France, vol. SA WG6, No. e-meeting, Jul. 20, 2020-Jul. 31, 2020, Jul. 15, 2020, 5 Pages, XP051908820.

* cited by examiner

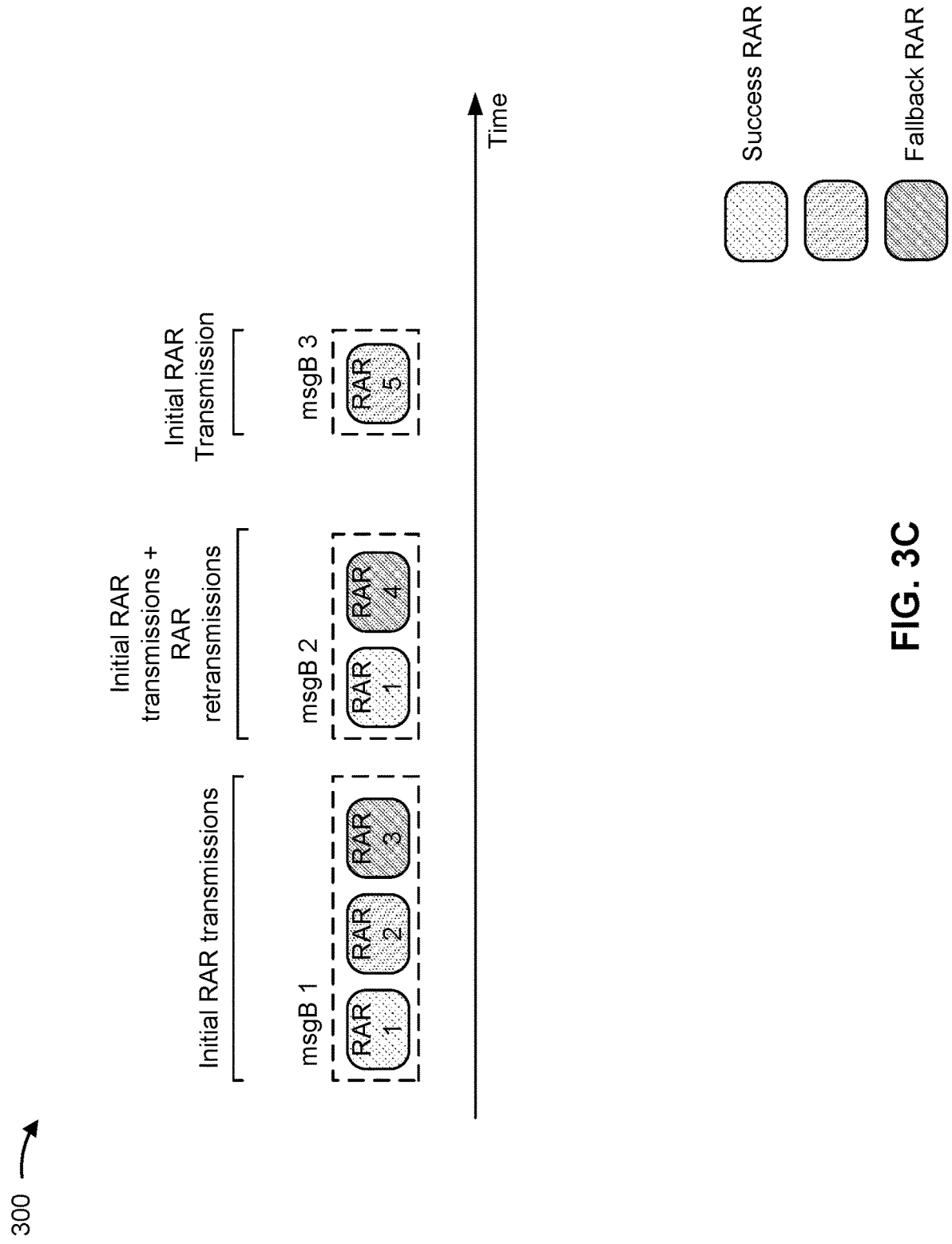

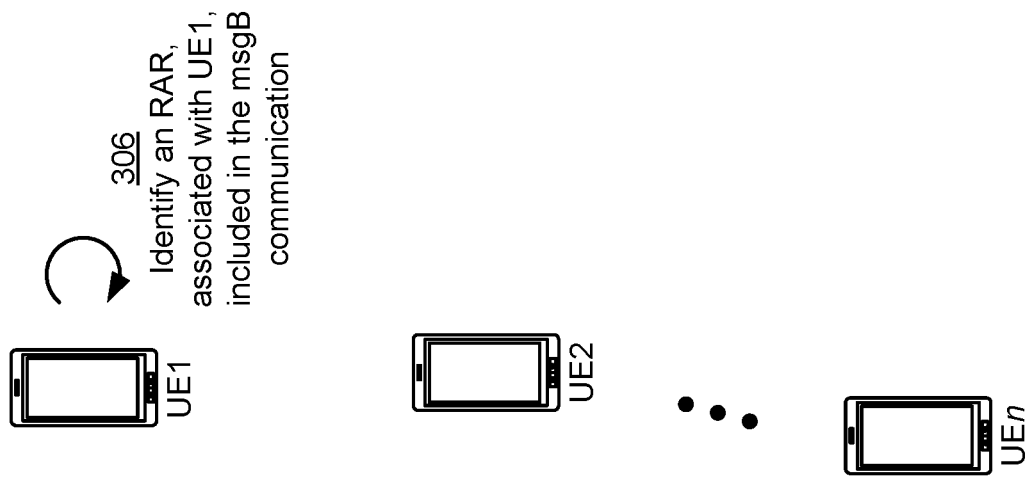
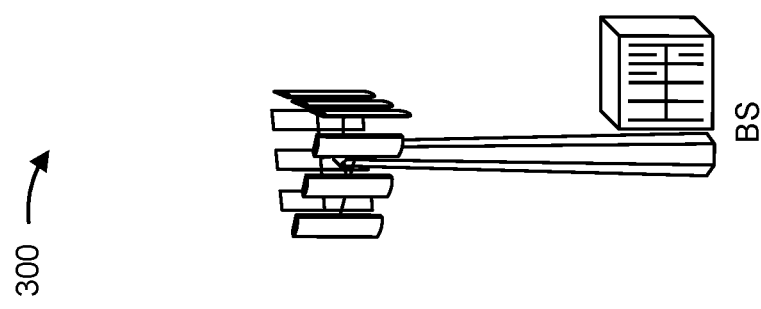
FIG. 3H

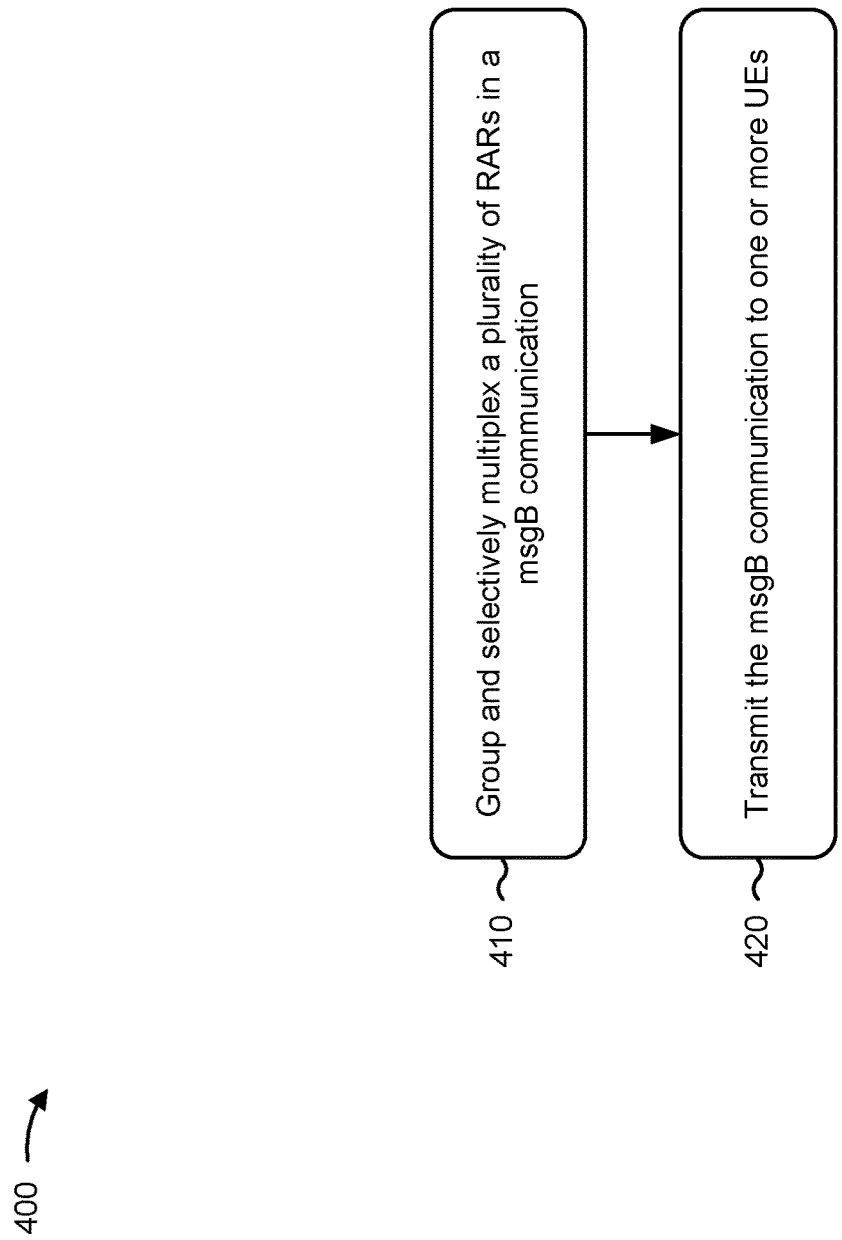

RANDOM ACCESS RESPONSE MAPPING FOR TWO-STEP RANDOM ACCESS CHANNEL PROCEDURE

CROSS-REFERENCE TO RELATED APPLICATIONS

This application is a continuation of U.S. patent application Ser. No. 16/948,956, filed Oct. 7, 2020, which claims priority to U.S. Provisional Patent Application No. 62/912,558, filed on Oct. 8, 2019, entitled "RANDOM ACCESS RESPONSE MAPPING FOR TWO-STEP RANDOM ACCESS CHANNEL PROCEDURE," and assigned to the assignee hereof. The contents of each of the above applications are incorporated herein by reference in their entireties.

FIELD OF THE DISCLOSURE

Aspects of the present disclosure generally relate to wireless communication and to techniques and apparatuses for random access response mapping for two-step random access channel procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BS s) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include grouping and selectively multiplexing a plurality of random access channel responses (RARs) in a message B (msgB) communication; and transmitting the msgB communication to one or more user equipments (UEs).

In some aspects, a method of wireless communication, performed by a UE, may include receiving, from a BS, a msgB communication associated with a two-step RACH procedure between the UE and the BS; and identifying an RAR, associated with the UE, among a plurality of RARs multiplexed in the msgB communication and supplementary scheduling information for other RARs.

In some aspects, a BS for wireless communication may include memory and one or more processors coupled to the memory. The memory and the one or more processors may be configured to grouping and selectively multiplex a plurality of RARs in a msgB communication; and transmit the msgB communication to one or more UEs.

In some aspects, a UE for wireless communication may include memory and one or more processors coupled to the memory. The memory and the one or more processors may be configured to receive, from a BS, a msgB communication associated with a two-step RACH procedure between the UE and the BS; and identify an RAR, associated with the UE, among a plurality of RARs multiplexed in the msgB communication and supplementary scheduling information for other RARs.

In some aspects, a non-transitory computer-readable medium may store one or more instructions for wireless communication. The one or more instructions, when executed by one or more processors of a BS, may cause the one or more processors to grouping and selectively multiplex a plurality of RARs in a msgB communication; and transmit the msgB communication to one or more UEs.

In some aspects, a non-transitory computer-readable medium may store one or more instructions for wireless communication. The one or more instructions, when executed by one or more processors of a UE, may cause the one or more processors to: receive, from a BS, a msgB communication associated with a two-step RACH procedure between the UE and the BS; and identify an RAR, associated with the UE, among a plurality of RARs multiplexed in the msgB communication and supplementary scheduling information for other RARs.

In some aspects, an apparatus for wireless communication may include means for grouping and selectively multiplexing a plurality of RARs in a msgB communication; and means for transmitting the msgB communication to one or more UEs.

In some aspects, an apparatus for wireless communication may include means for receiving, from a BS, a msgB communication associated with a two-step RACH procedure between the apparatus and the BS; and means for identifying an RAR, associated with the apparatus, among a plurality of RARs multiplexed in the msgB communication and supplementary scheduling information for other RARs.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3H are diagrams illustrating one or more examples of random access response mapping for two-step random access channel procedures, in accordance with various aspects of the present disclosure.

FIG. 4 is a diagram illustrating an example process performed, for example, by a BS, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
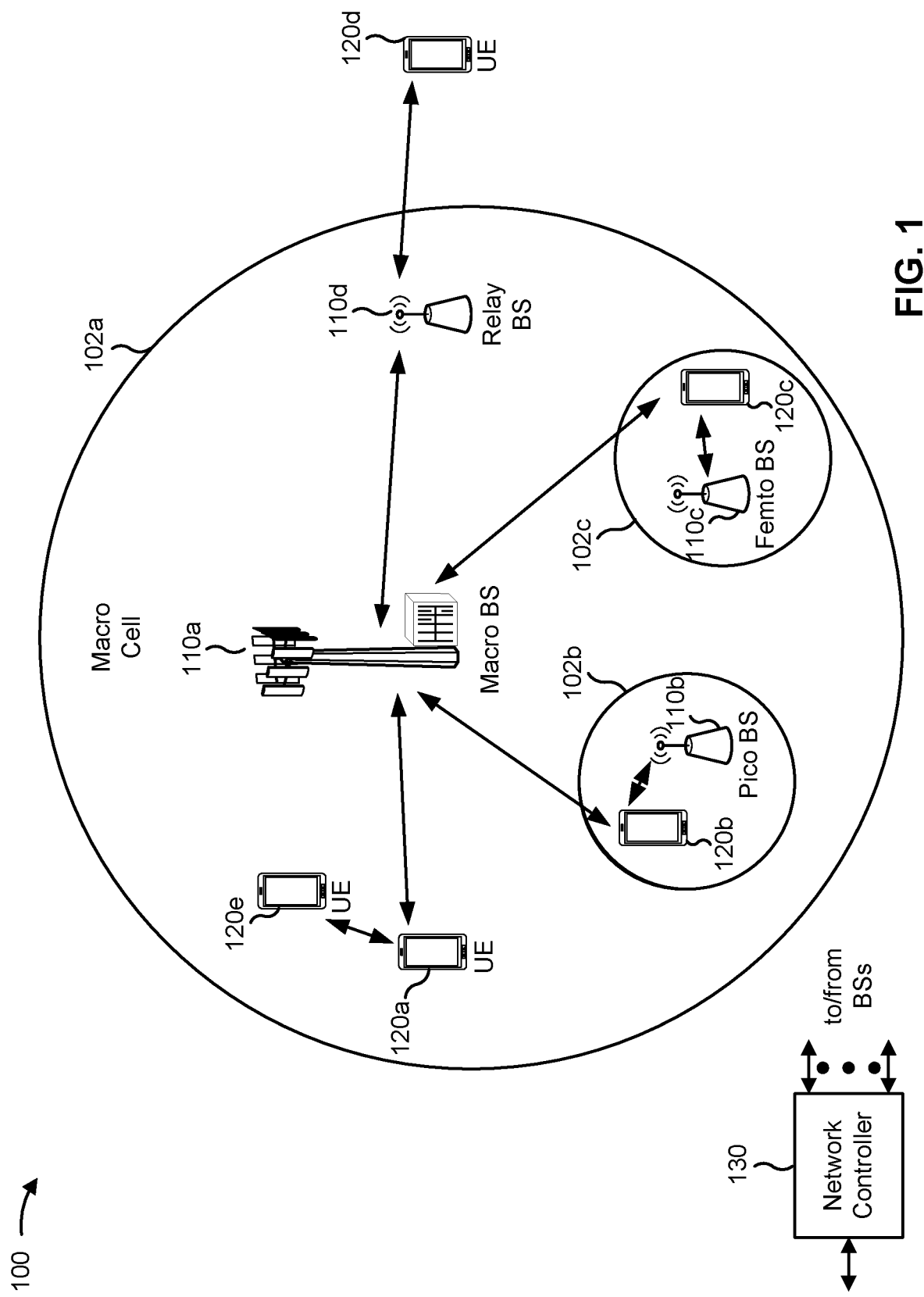
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
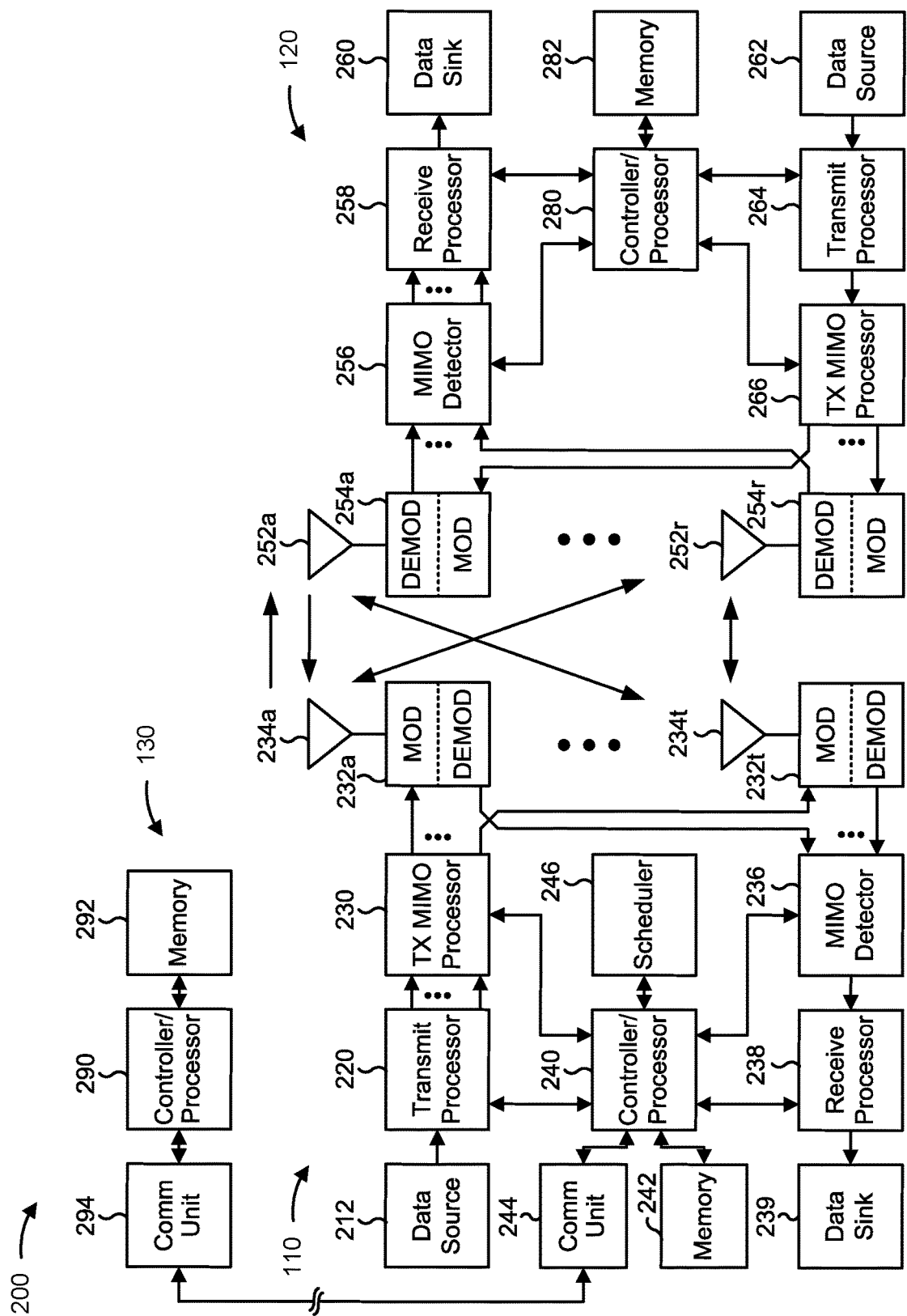
FIG. 2 is a block diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with random access response (RAR) mapping for two-step random access channel (RACH) procedures, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving, from a BS 110, a message B (msgB) communication associated with a two-step RACH procedure between the UE 120 and the BS 110, means for identifying an RAR, associated with the UE 120, among a plurality of RARs multiplexed in the msgB communication and supplementary scheduling information for other RARs, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for grouping and selectively multiplexing a plurality of RARs in a msgB communication, means for transmitting the msgB communication to one or more UEs 120, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may access a wireless network by negotiating a connection with a BS included in the wireless network. During connection establishment, the UE and the BS may synchronize the connection in the downlink direction (that is, from BS to UE) and in the uplink direction (that is, from UE to BS).

To synchronize the connection in the downlink direction, the UE may read a synchronization signal block (SSB) that includes various synchronization signals transmitted from the BS. The synchronization signals may include a primary synchronization signal (PSS), a secondary synchronization signal (SSS), a primary broadcast channel (PBCH), and/or the like. The UE may use the PSS to determine symbol timing in the downlink direction, may use the SSS to determine a physical cell identifier associated with the BS, and may use the PBCH to determine the frame timing.

To synchronize the connection in the uplink direction, the UE and the BS may perform a RACH procedure. In some aspects, the UE and the BS may perform a four-step RACH procedure. In a four-step RACH procedure, the UE and the BS may exchange four primary RACH communications. The UE may transmit a Message 1 (msg1) communication to the BS (e.g., as defined in a 3GPP four-step RACH procedure). The msg1 communication may be a RACH preamble communication that is transmitted in a RACH occasion (e.g., a particular set of time-frequency resources), the combination of which may be referred to as a RACH signature. The BS may respond to the msg1 communication with a Message 2 (msg2) communication (e.g., as defined in a 3GPP four-step RACH procedure), which may be a random access response (RAR) communication. The UE may respond to the msg2 communication with a Message 3 (msg3) communication (e.g., as defined in a 3GPP four-step RACH procedure), which may be a radio resource control (RRC) connection request communication. The BS may respond to the msg3 communication with a Message 4 (msg4) communication (e.g., as defined in a 3GPP four-step RACH procedure), which may be a medium access control (MAC) control element (MAC-CE) contention resolution identifier communication and may include an RRCSetup command, and/or the like.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the msg1 communication and the msg3 communication into a communication referred to as a message A (msgA) communication (e.g., as defined in a 3GPP two-step RACH procedure). The msg1 portion of the msgA communication may be referred to as the preamble portion of the msgA communication. The msg3 portion of the msgA communication may be referred to as the payload portion of the msgA communication. The UE may transmit the msg1 portion and the msg3 portion sequentially and prior to receiving the msg2 communication and the msg4 communication.

The BS may receive the msgA communication and may transmit a msgB communication (e.g., as defined in a 3GPP four-step RACH procedure), which may include the msg2 communication and the msg4 communication. The msgB communication may include a physical downlink control channel (PDCCH) portion and a physical downlink shared channel (PDSCH) portion. The PDSCH portion may carry the payload of the msgB communication, which may include an RAR directed to the UE.

The RAR may be a fallback RAR, a success RAR (with or without an associated radio resource control (RRC) message), a backoff indicator, and/or the like. A fallback RAR may be transmitted if the preamble portion of the msgA communication is detected and decoded but not the payload portion. A fallback RAR may indicate to the UE to fall back to a four-step RACH procedure, and may include a random access preamble identifier (RAPID) for the UE, an RAR grant, a timing advance command, and a temporary cell radio network temporary identifier (TC-RNTI) for retransmitting the msg3 or payload portion of the msgA communication.

A success RAR may be transmitted if the preamble portion and the payload portion are detected and decoded. A success RAR may indicate to the UE to proceed with the two-step RACH procedure, and may identify a contention resolution identifier, a timing advance command, and a cell radio network temporary identifier (C-RNTI).

A UE may monitor for a msgB communication during an RAR reception window. The starting point of the RAR reception window may be aligned with the first PDCCH symbol of the earliest search space for the msgB communication. If the UE does not receive a success RAR or fallback RAR by the expiration of the RAR reception window, the UE may retransmit the msgA communication.

In some cases, a BS may transmit a respective RAR to each of a plurality of UEs, where each RAR is included in a separate msgB communication. This may cause increased power consumption at the plurality of UEs because each UE may have to monitor for and decode a plurality of msgB communications during an associated RAR reception window to receive the RAR directed to the UE. Moreover, the BS may also transmit RAR retransmissions during the RAR reception window in separate msgB communications, which further increases the quantity of msgB communications that each UE may have to monitor for and decode during an associated RAR reception window.

Some aspects described herein provide techniques and apparatuses for RAR mapping for two-step RACH procedures. In some aspects, a BS may multiplex a plurality of RARs into a single msgB communication, and may transmit the msgB communication to one or more UEs. This permits the BS to reduce the quantity of msgB communications transmitted to the UEs relative to transmitting the plurality of RARs in individual and/or separate msgB communications. The reduced quantity of msgB communications in turn decreases processing, memory, and power resource consumption at the UEs because the UEs may monitor for and decode fewer msgB communications during associated RAR reception windows to receive RARs.

To further decrease processing, memory, and power resource consumption at the UEs, the BS may multiplex the same type of RARs and/or different types of RARs in the same msgB communication, which permits success RARs, fallback RARs, initial RAR transmissions, and/or RAR retransmissions to be included in the same msgB communication. The BS may also provide an early indication of which msgB communication will carry an RAR directed to a particular UE or group of UEs, which further decreases processing, memory, and power resource consumption at the UEs.

FIGS. 3A-3H are diagrams illustrating one or more examples 300 of RAR mapping for two-step RACH procedures, in accordance with various aspects of the present disclosure. As shown in FIGS. 3A-3H, example(s) 300 may include communication between a BS (e.g., BS 100) and a plurality of UEs (e.g., UE 120), such as UE1-UEn, and/or the like. The BS and the plurality of UEs may be included in a wireless network, such as wireless network 100 and/or the like.

In some aspects, each of the plurality of UEs may perform a RACH procedure with the BS to establish a wireless connection with the BS. The RACH procedure may include, for example, a two-step RACH procedure, a four-step RACH procedure, and/or the like. In some aspects, a UE of the plurality of UEs may initiate a two-step RACH procedure by transmitting a msgA communication to the BS. In this case, the UE may transmit a preamble portion of the msgA communication in a preamble occasion (e.g., one or more time-frequency resources configured for RACH preamble transmission), and may transmit a payload portion of the msgA communication in a physical uplink shared channel (PUSCH) occasion (e.g., one or more time-frequency resources configured for msgA payload transmission).

Figure 3A:
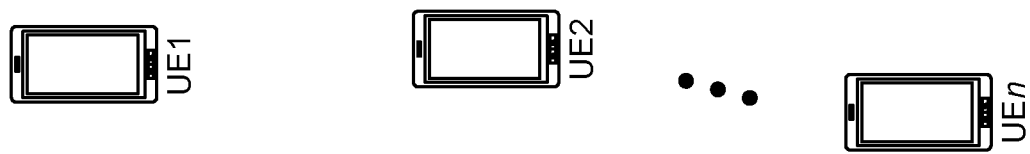

As shown in FIG. 3A, and by reference number 302, the BS may multiplex RARs directed to the plurality of UEs in a msgB communication. In some aspects, the BS may multiplex the RARs directed to the plurality of UEs in the same msgB communication. In some aspects, the BS may time division multiplex RARs in the msgB communication, may frequency division multiplex RARs in the msgB communication, may spatially multiplex RARs in the msgB communication, or a combination thereof. In some aspects, the BS may multiplex subsets of the RARs directed to the plurality of UEs in different msgB communications. In this case, the BS may scramble the msgB communications with the same RNTI (e.g., same msgB-RNTI and/or another type of RNTI). In some aspects, if the RAR window if long (e.g., >=20 ms), the value of the msgB RNTI may change over time. For example, msgB_RNTI (K)=msgB_RNTI(K−1)+delta(K−1), wherein delta(K−1) captures the time variation of msgB_RNTI from radio frame (K−1) to radio frame (K). This, in some cases, the BS may scramble the msgB communications using the same set of msgB radio network temporary identifiers mapped to the same random access occasion.

In some aspects, the BS may multiplex the same type of RARs in a msgB communication, may multiplex different types of RARs in the msgB communication, or a combination thereof. For example, the BS may multiplex one or more success RARs (with or without an associated RRC message) in a msgB communication, may multiplex one or more fallback RARs in the msgB communication, and/or the like. As another example, the BS may multiplex initial or first transmissions of one or more RARs in a msgB communication (e.g., one or more initial or first transmissions of a success RAR, a fallback RAR, and/or the like), may multiplex retransmissions of one or more RARs in the msgB communication (e.g., one or more retransmissions of a success RAR, a fallback RAR, and/or the like), and/or the like.

Figure 3B:
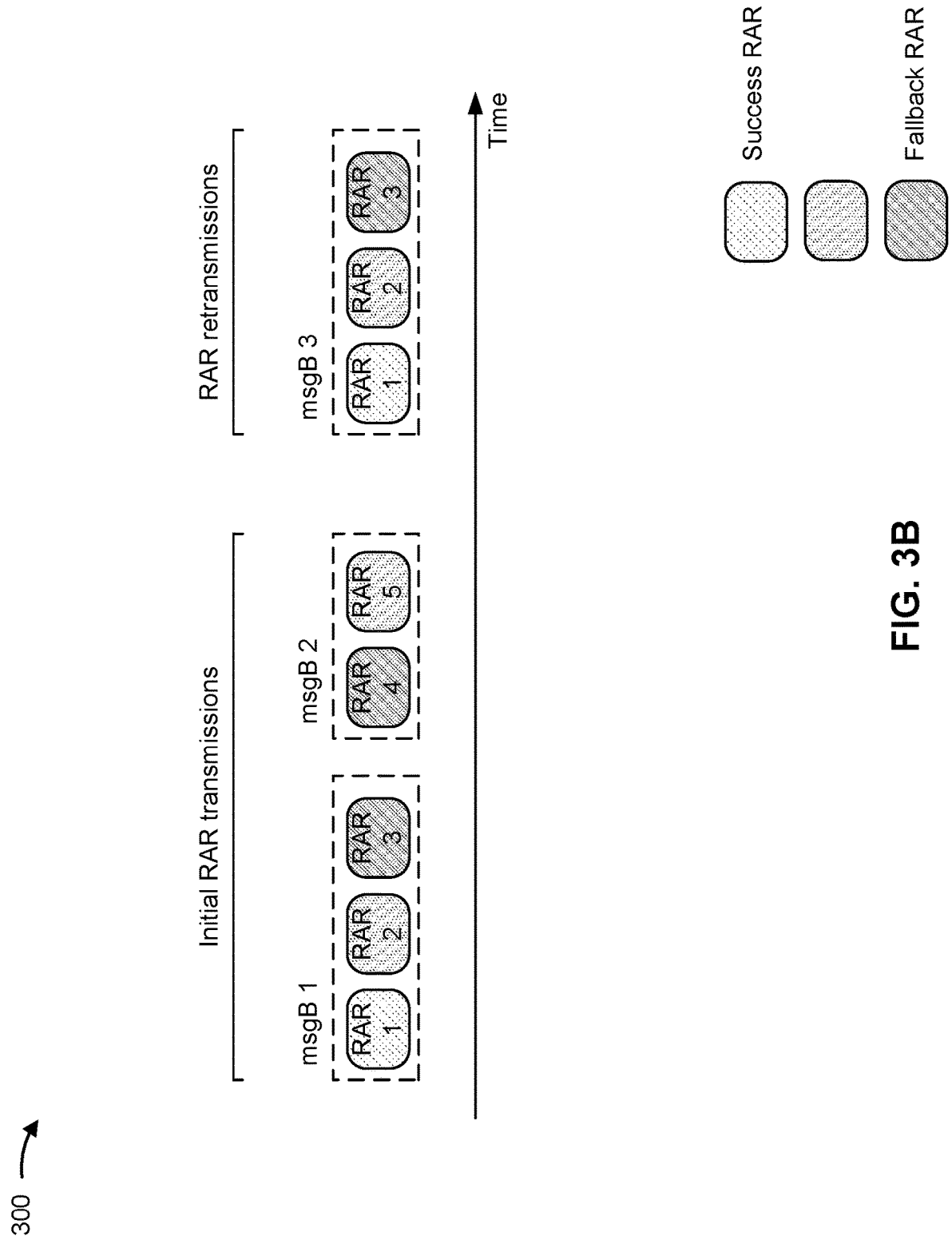

FIGS. 3B and 3C illustrate various examples of RARs multiplexed in one or more msgB communications. As shown in an example illustrated in FIG. 3B, the BS may multiplex different subsets of RARs directed to five UEs (e.g., RAR 1 through RAR 5) in respective msgB communications. In particular, the BS may multiplex the initial transmissions of RAR 1, RAR 2, and RAR 3 (e.g., directed to a UE1, a UE2, and a UE3, respectively) in msgB 1, may multiplex the initial transmissions of RAR 4 and RAR 5 (e.g., directed to UE4 and UE5, respectively) in msgB 2, and may multiplex retransmissions of RAR 1, RAR 2, and RAR 3 (e.g., directed to a UE1, a UE2, and a UE3, respectively) in msgB 3.

As further shown in the example illustrated in FIG. 3B, different types of RARs may be multiplexed in the same msgB communication. For example, msgB 1 may include a success RAR without an associated RRC message (e.g., RAR 1), a success RAR with an associated RRC message (e.g., RAR 2), and a fallback RAR (e.g., RAR 3). As another example, msgB 2 may include a fallback RAR (e.g., RAR 4) and a success RAR with an associated RRC message (e.g., RAR 5). As another example, msgB 3 may include a success RAR without an associated RRC message (e.g., RAR 1), a success RAR with an associated RRC message (e.g., RAR 2), and a fallback RAR (e.g., RAR 3).

As shown in an example illustrated in FIG. 3C, the BS may multiplex different subsets of RARs directed to five UEs (e.g., RAR 1 through RAR 5) in respective msgB communications. In particular, the BS may multiplex the initial transmissions of RAR 1, RAR 2, and RAR 3 (e.g., directed to a UE1, a UE2, and a UE3, respectively) in msgB 1, may multiplex a retransmission of RAR 1 with the initial transmissions of RAR 4 (e.g., directed to UE4) in msgB 2, and may include the initial transmission of RAR 5 (e.g., directed to a UE5) in msgB 3.

As further shown in the example illustrated in FIG. 3B, different types of RARs may be multiplexed in the same msgB communication. For example, msgB 1 may include a success RAR without an associated RRC message (e.g., RAR 1), a success RAR with an associated RRC message (e.g., RAR 2), and a fallback RAR (e.g., RAR 3). As another example, msgB 2 may include an initial transmission of a fallback RAR (e.g., RAR 4) and a retransmission of a success RAR without an associated RRC message (e.g., RAR 1).

The BS may use various techniques to identify RARs that are to be multiplexed in the same msgB communication. In some aspects, the BS may multiplex RARs in the same msgB communication based at least in part on respective priorities associated with each of the RARs. For example, the BS may multiplex RARs of a high priority in the same msgB communication and may transmit the msgB communication earlier in time relative to a msgB communication carrying multiplexed RARs of a relatively lower priority.

In some aspects, the BS may multiplex RARs in the same msgB communication based at least in part on respective payload sizes associated with the RARs to efficiently use the available space in the msgB communication. For example, the BS may be permitted to include a particular quantity of bits or bytes in the payload portion of a msgB communication, and the BS may multiplex RARs in the msgB communication such that the RARs utilize the most amount of the available space in the msgB communication.

In some aspects, the BS may group RARs, directed to UEs that transmitted preambles in the same preamble occasion, into one or more sets of RARs. The BS may multiplex each set of RARs into a respective msgB communication such that the transmissions of the sets of RARs are ordered in time. The order of the sets of RARs may be based at least in part on starting symbols of respective RAR reception windows associated with each of the UEs. For example, the BS may multiplex RARs directed to a first group or set of UEs having an associated RAR reception window starting on the same symbol into a first msgB communication, may multiplex RARs directed to a second group or set of UEs having an associated RAR reception window starting on the same symbol into a second msgB communication, and so on.

Figure 3D:
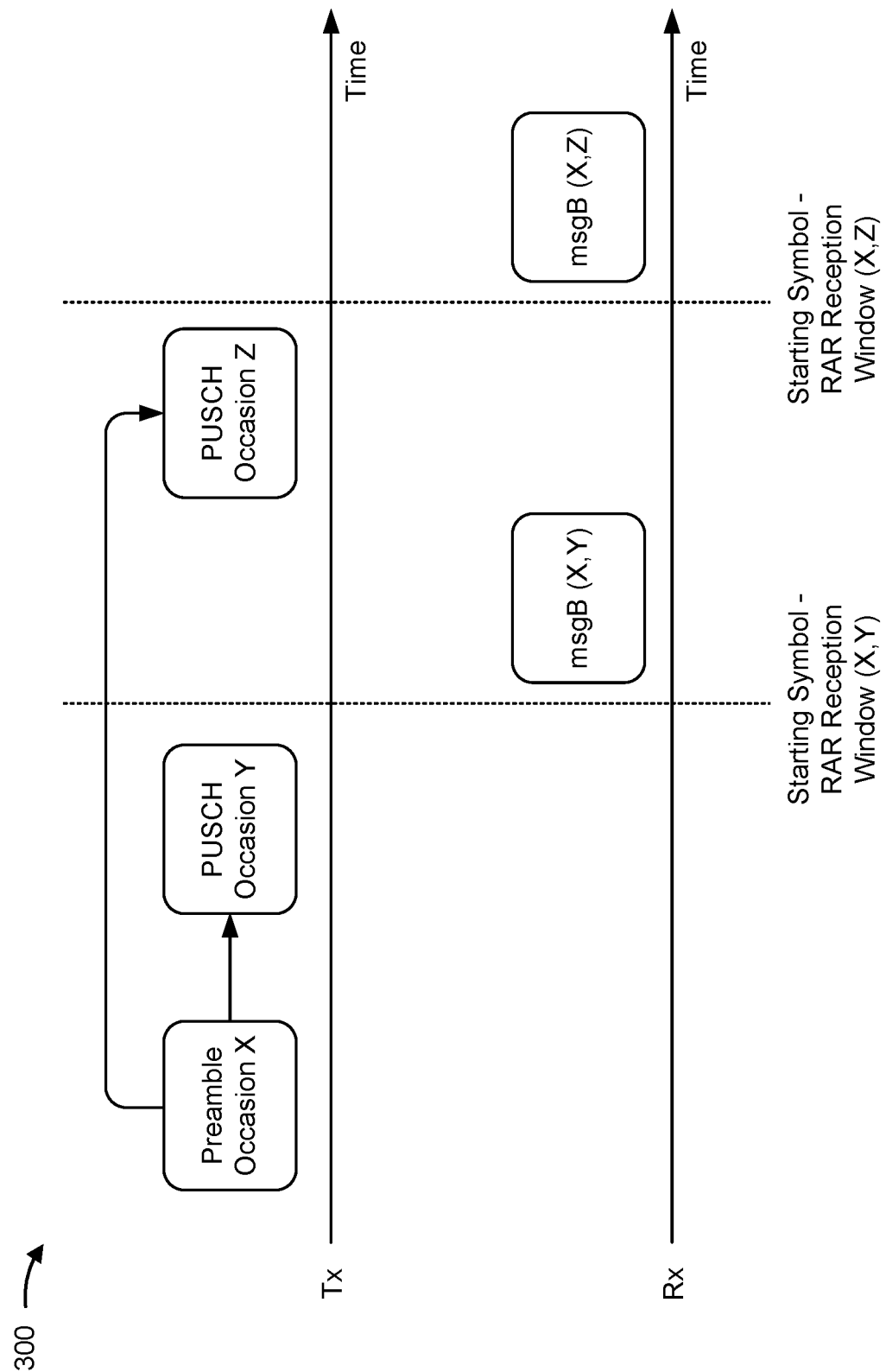
Figure 3E:
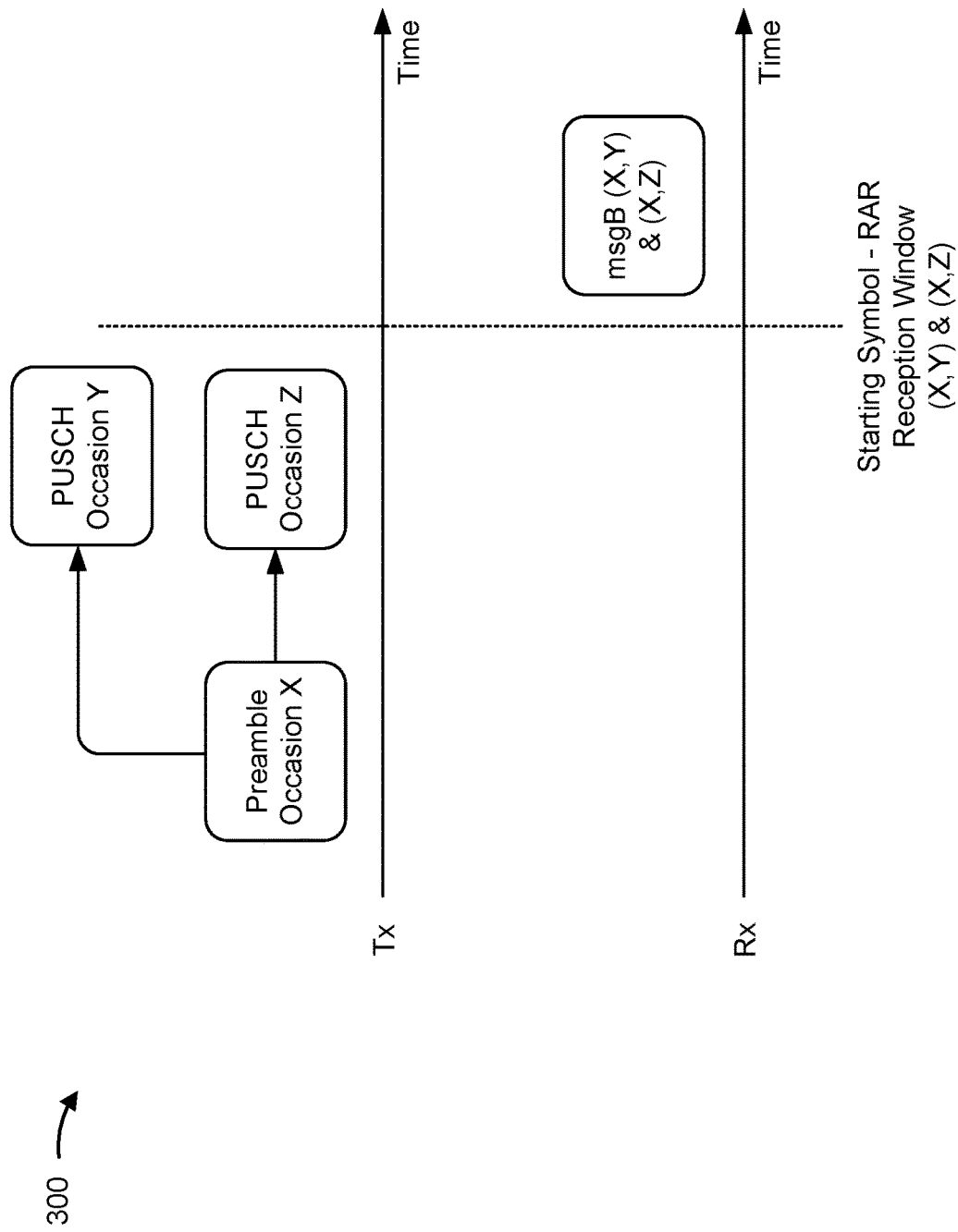

FIGS. 3D and 3E illustrate various examples of grouping RARs into sets based at least in part on a starting symbol of a respective RAR reception window associated with one or more UEs. In an example illustrated in FIG. 3D, a plurality of UEs may transmit RACH preambles (e.g., preamble portions of a msgA communication in a two-step RACH procedure) in the same preamble occasion X. A first subset of the UEs may transmit a msgA payload portion in a PUSCH occasion Y, and a second subset of the UEs may transmit a msgA payload portion in a PUSCH occasion Z that occurs after PUSCH occasion Y. In this example, the starting symbol of a first RAR reception window associated with preamble occasion/PUSCH occasion combination (X,Y) may be a different symbol than the starting symbol of a second RAR reception window associated with preamble occasion/PUSCH occasion combination (X,Z). Accordingly, the BS may multiplex RARs directed to the first subset of UEs into a first msgB communication (X,Y) and may transmit the first msgB communication in the first RAR reception window. Moreover, the BS may multiplex RARs directed to the second subset of UEs into a second msgB communication (X,Z) and may transmit the second msgB communication in the second RAR reception window.

In an example illustrated in FIG. 3E, a plurality of UEs may transmit RACH preambles (e.g., preamble portions of a msgA communication in a two-step RACH procedure) in the same preamble occasion X. A first subset of the UEs may transmit a msgA payload portion in a PUSCH occasion Y, and a second subset of the UEs may transmit a msgA payload portion in a PUSCH occasion Z. In this example, the starting symbol of a first RAR reception window associated with preamble occasion/PUSCH occasion combination (X,Y) may be the same symbol as the starting symbol of a second RAR reception window associated with preamble occasion/PUSCH occasion combination (X,Z). Accordingly, the BS may multiplex RARs directed to the first subset of UEs and the second subset of UEs into the same msgB communication (X,Y) & (X,Z), and may transmit the msgB communication in the RAR reception window.

Figure 3F:
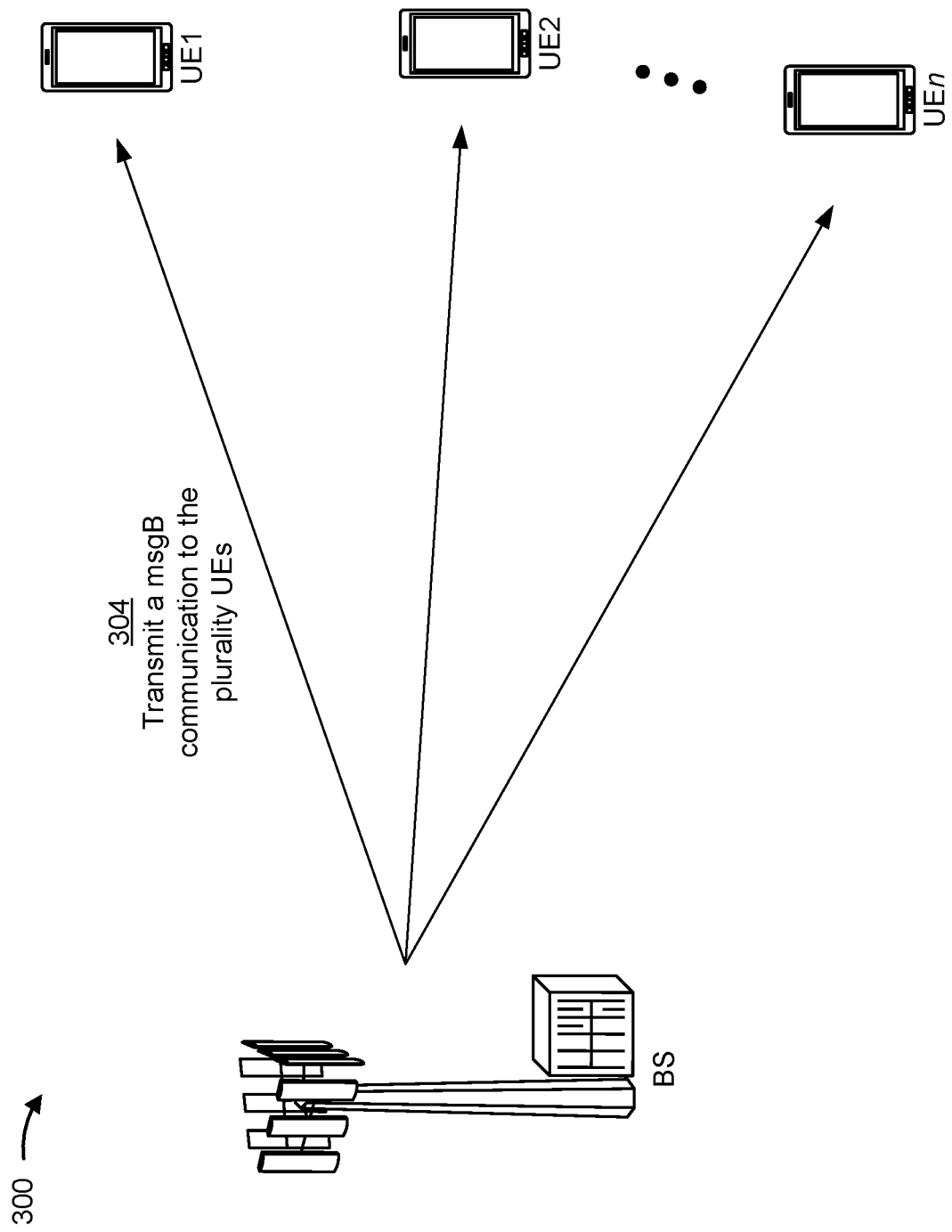

As shown in FIG. 3F, and by reference number 304, the BS may transmit a msgB communication to the plurality of UEs. The msgB communication may include a multiplexed plurality of RARs directed to the plurality of UEs. In some aspects, if the BS multiplexes subsets of the plurality of RARs in different msgB communications, the BS may transmit the msgB communications to the plurality of UEs. The BS may transmit the msgB communication(s) during RAR reception windows associated with each of the plurality of UEs.

As indicated above, a UE may monitor for and decode msgB communications during an associated RAR reception window. A UE may need to decode a plurality of msgB communications before identifying the RAR directed to the UE, which increases processing, memory, and/or power consumption at the UE. To decrease the quantity of msgB communications that are to be decoded by the UE during the RAR reception window, the BS may include an early indicator, in one or more msgB communications transmitted during the RAR reception window, of a transmission timing for the msgB communication carrying the RAR directed to the UE. In this way, the UE may decode a msgB communication, may identify the early indicator in the msgB communication (e.g., which may identify a subsequent msgB communication that will carry the RAR directed to the UE), and may refrain from monitoring for and decoding any intervening msgB communications prior to the msgB communication carrying the RAR directed to the UE.

Figure 3G:
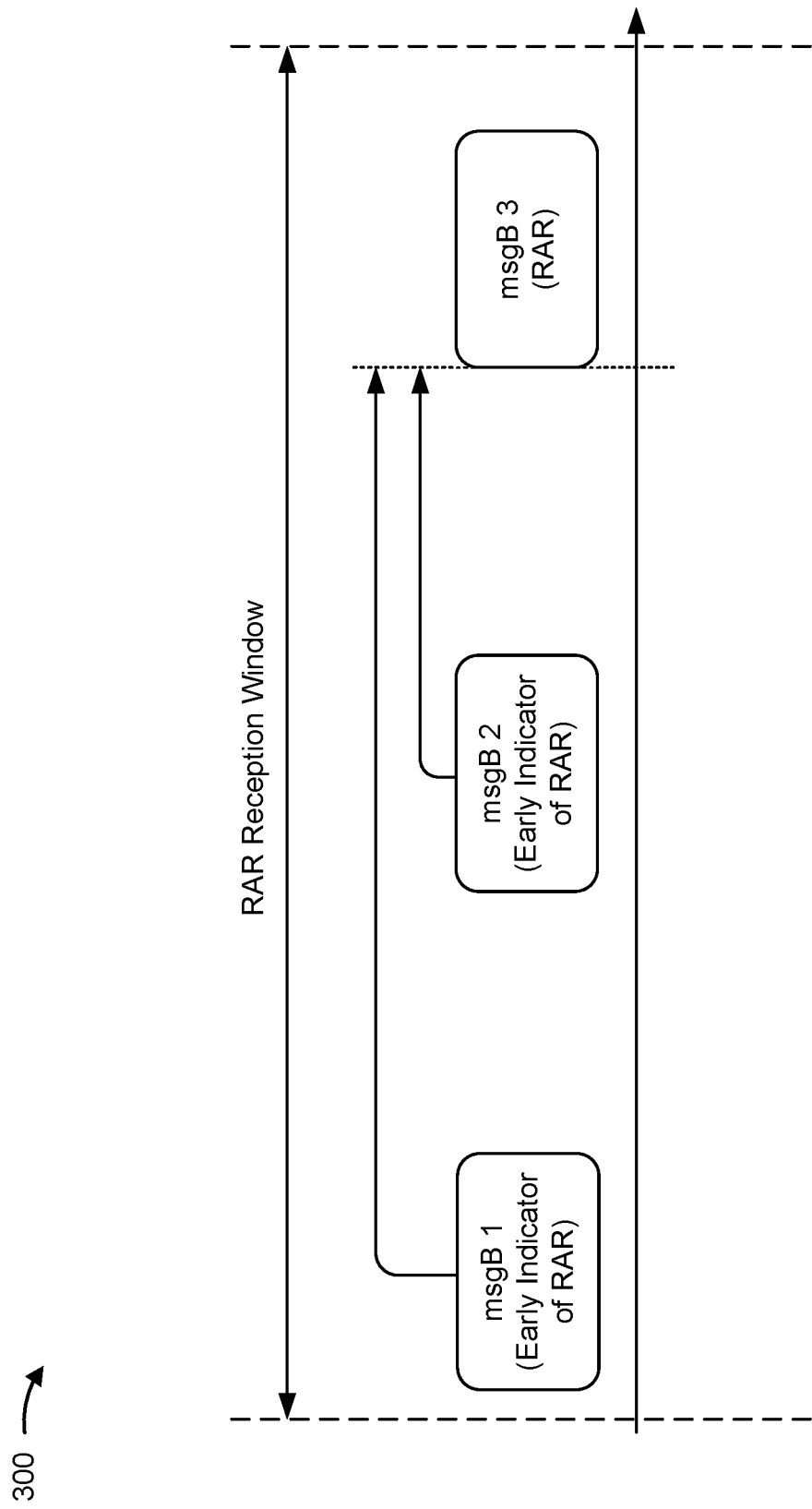

FIG. 3G illustrates an example of an early indicator of an RAR directed to a UE (or a set or group of UEs). As shown in FIG. 3G, the BS may transmit a plurality of msgB communications during an RAR reception window associated with one or more UEs. The RAR(s) directed to the UE(s) may be included in msgB 3, which may be transmitted after msgB 1 and msgB 2 in the RAR reception window. In this example, the BS may include the early indicator, that the RAR(s) will be included in msgB 3, in msgB 1 and msgB 2. Accordingly, a UE may receive and decode msgB 1, identify the early indicator, and refrain from receiving and decoding msgB 2 based at least in part on the early indicator. If the UE misses or is unable to decode msgB 1, the UE may receive and decode msgB 2, may identify the early indicator, and may monitor for and receive msgB 3 based at least in part on the early indicator.

In some aspects, the BS may include an early indicator of a transmission timing for a msgB communication carrying an RAR in a PDCCH portion of another msgB communication, in a PDSCH portion of another msgB communication, and/or the like. For example, an early indicator may be included in downlink control information (DCI) in the PDCCH portion of another msgB communication, may be included in a medium access control (MAC) sub-header in the PDCCH portion or PDSCH portion, may be included in a MAC sub-protocol data unit (PDU) in the PDCCH portion or PDSCH portion, and/or the like.

In some aspects, an early indicator of a transmission timing for a msgB communication carrying an RAR may include a compressed UE identifier associated with the UE (or UEs) to which the RAR is directed. The UE may determine that the early indicator is for the UE based at least in part on the compressed UE identifier indicated in the msgB communication carrying the early indicator. The compressed UE identifier may include a RAPID associated with the UE, a most significant bit (MSB) of a C-RNTI associated with the UE, a least significant bit (LSB) of the C-RNTI associated with the UE, an MSB of an idle or inactive radio network temporary identifier (I-RNTI) associated with the UE, an LSB of the I-RNTI associated with the UE, and/or another type of compressed UE identifier.

In some aspects, the early indicator may include a timing offset between the msgB communication carrying the early indicator and the msgB communication carrying the RAR directed to the UE, and the timing offset may include a slot-level offset, a symbol-level offset, a back off indication, or a combination thereof. The timing offset may be specified for a control resource set (CORESET) or search space associated with the msgB communication carrying the RAR directed to the UE, and may be indicated relative to the msgB communication carrying the early indicator. In some aspects, the early indicator may include an index of the search space associated with the msgB communication carrying the RAR directed to the UE. Accordingly, the UE may identify the msgB communication carrying the RAR directed to the UE based at least in part on the timing offset and/or the index of the search space.

As shown in FIG. 3H, and by reference number 306, UE1 may receive a msgB communication from the BS and may identify an RAR, associated with UE1, included in the msgB communication. In some aspects, UE1 may identify the RAR among a plurality of RARs multiplexed in the msgB communication. In some aspects, UE1 may identify the RAR based at least in part on the RAR being scrambled using an RNTI associated with the UE and/or another type of UE identifier associated with the UE. In some aspects, the other UEs in the plurality of UEs may receive msgB communications from the BS and may identify associated RARs using similar techniques.

In some aspects, a UE (e.g., UE1 and/or another UE of the plurality of UEs) may transmit hybrid automatic repeat request (HARQ) feedback to the BS based at least in part on a msgB communication. The HARQ feedback may include an acknowledgement (ACK) if the UE is able to decode the msgB communication, or a negative ACK (NACK) if the UE is unable to decode the msgB communication or did not receive the msgB communication. In some aspects, the UE may transmit the HARQ feedback in a physical uplink control channel (PUCCH) communication to the BS (e.g., during a two-step RACH procedure, after the two-step RACH procedure, and/or the like).

In some aspects, the BS may include one or more PUCCH parameters for the HARQ feedback in the associated msgB communication, in another msgB communication that is transmitted prior to the associated msgB communication (e.g., along with an early indicator), and/or the like. The one or more PUCCH parameters may be included in a PDCCH portion of a msgB communication, in a PDSCH portion of a msgB communication, and/or the like. In some aspects, a UE may transmit HARQ feedback associated with a msgB communication based at least in part on the one or more PUCCH parameters.

To reduce signaling overhead of transmitting an indication of the one or more PUCCH parameters, the BS may configure the one or more PUCCH parameters to include one or more common PUCCH parameters that are shared by a plurality of UEs, and one or more UE-specific PUCCH parameters that are specific to a particular UE. The one or more common PUCCH parameters may include a common PUCCH power control parameter (e.g., an indication of a transmit power for the PUCCH communication carrying the HARQ feedback), a PUCCH resource allocation (e.g., an indication of a common set of time-frequency resources for transmitting the PUCCH communication carrying the HARQ feedback), a HARQ feedback timing indicator (e.g., an indication of a timing for transmitting the HARQ feedback), and/or the like. The one or more UE-specific PUCCH parameters may include a UE-specific PUCCH power control parameter, a PDSCH-to-HARQ feedback timing indicator, a UE-specific PUCCH resource allocation, a UE-specific HARQ feedback timing indicator, and/or other UE-specific parameters.

In some aspects, the one or more common PUCCH parameters may be included in DCI of a PDCCH portion of a msgB communication, in a MAC sub-header of a PDSCH portion of the msgB communication, in a MAC sub-PDU of the PDSCH portion of the msgB communication, and/or the like. In some aspects, the one or more UE-specific PUCCH parameters may be included in a MAC sub-header of a PDSCH portion of the msgB communication, in a MAC sub-PDU of the PDSCH portion of the msgB communication, or be derived implicitly from the ordering of UE specific MAC sub-header, the ordering of UE specific MAC sub-PDU, the preamble sequence index, the demodulation reference signal (DMRS) resource index, the PUSCH resource unit index, and/or the like.

In this way, the BS may multiplex a plurality of RARs into a single msgB communication, and may transmit the msgB communication to one or more of the plurality of UEs. This permits the BS to reduce the quantity of msgB communications transmitted to the UEs relative to transmitting the plurality of RARs in individual and/or separate msgB communications. The reduced quantity of msgB communications in turn decreases processing, memory, and power resource consumption at the UEs because the UEs may monitor for and decode fewer msgB communications during associated RAR reception windows to receive RARs. Moreover, the BS may further decrease processing, memory, and power resource consumption at the UEs by multiplexing the same type of RARs and/or different types of RARs in the same msgB communication, which may permit success RARs, fallback RARs, initial RAR transmissions, and/or RAR retransmissions to be included in the same msgB communication. The BS may also provide an early indication of which msgB communication will carry an RAR directed to a particular UE or group of UEs, which further decreases processing, memory, and power resource consumption at the UEs.

As indicated above, FIGS. 3A-3H are provided as one or more examples. Other examples may differ from what is described with respect to FIGS. 3A-3H.

FIG. 4 is a diagram illustrating an example process 400 performed, for example, by a BS, in accordance with various aspects of the present disclosure. Example process 400 is an example where the BS (e.g., BS 110) performs operations associated with RAR mapping for two-step RACH procedures.

As shown in FIG. 4, in some aspects, process 400 may include grouping and selectively multiplexing a plurality of RARs in a msgB communication (block 410). For example, the BS (e.g., using transmit processor 220, receive processor 238, controller/processor 240, memory 242, and/or the like) may grouping and selectively multiplex a plurality of RARs in a msgB communication, as described above.

As further shown in FIG. 4, in some aspects, process 400 may include transmitting the msgB communication to one or more UEs (block 420). For example, the BS (e.g., using transmit processor 220, receive processor 238, controller/processor 240, memory 242, and/or the like) may transmit the msgB communication to one or more UEs, as described above.

Process 400 may include additional aspects, such as any single aspect or any combination of aspects described below and/or in connection with one or more other processes described elsewhere herein.

In a first aspect, grouping and selectively multiplexing the plurality of RARs in the msgB communication comprises multiplexing the plurality of RARs and supplementary scheduling information for other RARs in a plurality of msgB communications, the msgB communication being included in the plurality of msgB communications, wherein the plurality of msgB communications are time division multiplexed. In a second aspect, alone or in combination with the first aspect, process 400 includes scrambling the plurality of msgB communications using a same msgB radio network temporary identifier or a same set of msgB radio network temporary identifiers mapped to the same random access occasion (RO). In a third aspect, alone or in combination with one or more of the first and second aspects, the plurality of RARs comprise at least one of one or more fallback RARs, one or more success RARs with an associated RRC message, or one or more success RARs without an RRC message.

In a fourth aspect, alone or in combination with one or more of the first through third aspects, the plurality of RARs comprise at least one of an initial transmission of one or more RARs of the plurality of RARs or a retransmission of one or more RARs of the plurality of RARs. In a fifth aspect, alone or in combination with one or more of the first through fourth aspects, multiplexing the plurality of RARs in the msgB communication comprises multiplexing the plurality of RARs in the msgB communication based at least in part on at least one of a starting symbol of a respective RAR reception window associated with each of the one or more UEs sharing a same random access occasion, a respective priority associated with each of the plurality of RARs, a respective quality of service (QoS) class associated with each of the plurality of RARs, or a respective payload size of each of the plurality of RARs.

In a sixth aspect, alone or in combination with one or more of the first through fifth aspects, process 400 includes transmitting, to the one or more UEs, an indication of a transmission timing for the msgB communication. In a seventh aspect, alone or in combination with one or more of the first through sixth aspects, the indication of the transmission timing for the msgB communication is included in another msgB communication, and transmitting the indication of the transmission timing for the msgB communication comprises transmitting the other msgB communication prior to transmitting the msgB communication.

In an eighth aspect, alone or in combination with one or more of the first through seventh aspects, the indication of the transmission timing for the msgB communication is included in at least one of DCI of the other msgB communication, a MAC sub-header of the other msgB communication, or a MAC sub-protocol data unit of the other msgB communication. In a ninth aspect, alone or in combination with one or more of the first through eighth aspects, the indication of the transmission timing for the msgB communication comprises at least one of a respective compressed UE identifier associated with each of the one or more UEs, a timing offset, relative to the other msgB communication, of a control resource set or search space associated with the msgB communication, or an index of the search space associated with the msgB communication.

In a tenth aspect, alone or in combination with one or more of the first through ninth aspects, the respective compressed UE identifier associated with each of the one or more UEs comprises a random access preamble identifier, an MSB of a C-RNTI, an LSB of the C-RNTI, an MSB of an I-RNTI, or an LSB of the I-RNTI. In an eleventh aspect, alone or in combination with one or more of the first through tenth aspects, the msgB communication identifies one or more PUCCH parameters for HARQ feedback associated with the msgB communication, wherein the one or more PUCCH parameters comprise at least one of one or more common PUCCH parameters or one or more UE-specific PUCCH parameters.

In a twelfth aspect, alone or in combination with one or more of the first through eleventh aspects, the one or more common PUCCH parameters comprise at least one of a PUCCH power control parameter, a PUCCH resource allocation, a PDSCH-to-HARQ feedback timing indicator, or a HARQ feedback timing indicator. In a thirteenth aspect, alone or in combination with one or more of the first through twelfth aspects, the one or more common PUCCH parameters are included in at least one of DCI included in a PDCCH portion of the msgB communication, a common MAC sub-header included in a PDSCH portion of the msgB communication, or a common MAC sub-PDU included in the PDSCH portion of the msgB communication, and the one or more UE-specific PUCCH parameters are included in at least one of a UE-specific MAC sub-header included in the PDSCH portion of the msgB communication or a UE-specific MAC sub-PDU included in the PDSCH portion of the msgB communication. The UE-specific PUCCH parameters can also be derived from an implicit indication based on the ordering of UE-specific MAC sub-header, the ordering of UE-specific MAC sub-PDU, the preamble sequence index, the DMRS resource index or the PUSCH resource unit index used by the UE in the two-step random access procedure.

In a fourteenth aspect, alone or in combination with one or more of the first through twelfth aspects, process 400 further comprises transmitting, to the one or more UEs, an indication of a transmission timing for the msgB communication in the supplementary scheduling information for other RARs to be mapped to a different msgB communication.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
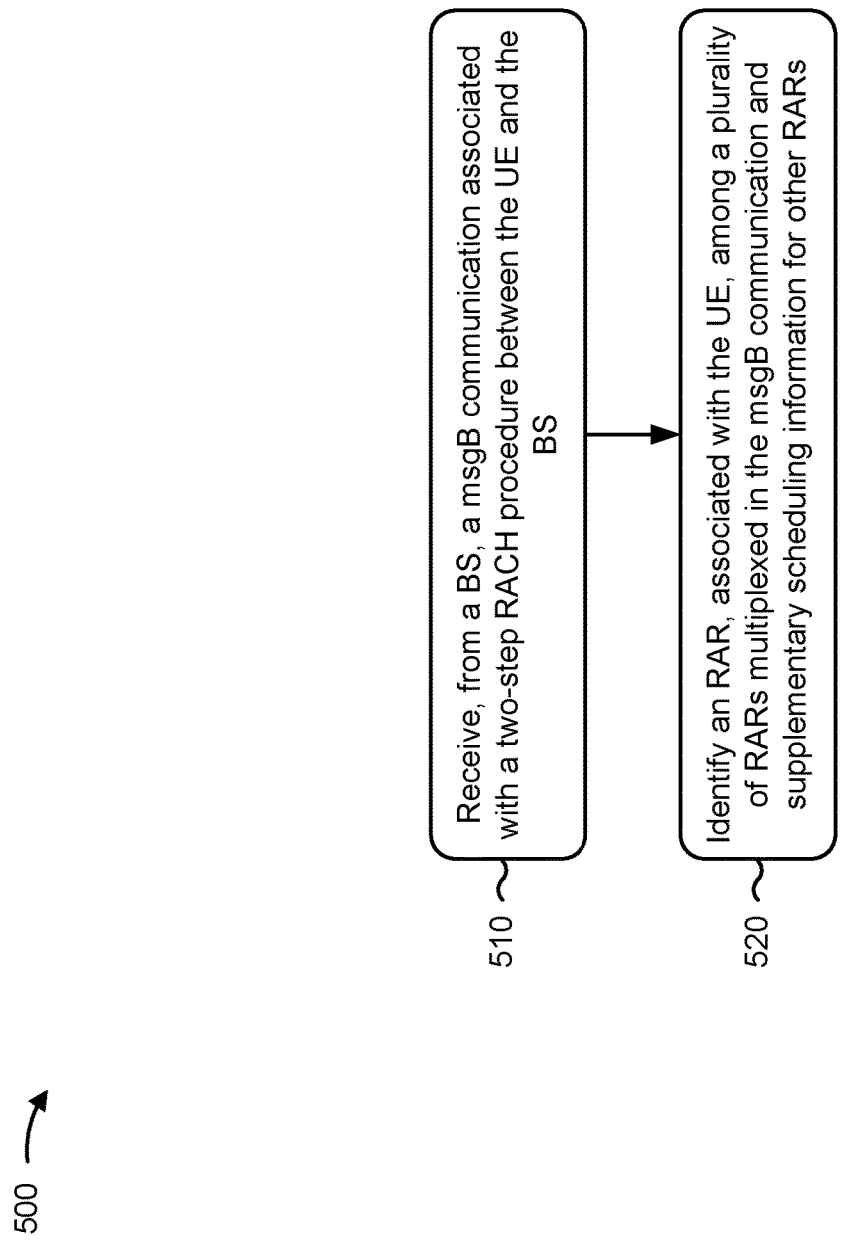
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120) performs operations associated with RAR mapping for two-step RACH procedures.

As shown in FIG. 5, in some aspects, process 500 may include receiving, from a BS, a msgB communication associated with a two-step RACH procedure between the UE and the BS (block 510). For example, the UE (e.g., using receive processor 258, transmit processor 264, controller/processor 280, memory 282, and/or the like) may receive, from a BS, a msgB communication associated with a two-step RACH procedure between the UE and the BS, as described above.

As further shown in FIG. 5, in some aspects, process 500 may include identifying an RAR, associated with the UE, among a plurality of RARs multiplexed in the msgB communication and supplementary scheduling information for other RARs (block 520). For example, the UE (e.g., using receive processor 258, transmit processor 264, controller/processor 280, memory 282, and/or the like) may identify an RAR, associated with the UE, among a plurality of RARs multiplexed in the msgB communication and supplementary scheduling information for other RARs, as described above.

Process 500 may include additional aspects, such as any single aspect or any combination of aspects described below and/or in connection with one or more other processes described elsewhere herein.

In a first aspect, the plurality of RARs comprise at least one of one or more fallback RARs, one or more success RARs with an associated RRC message, or one or more success RARs without an RRC message. In a second aspect, alone or in combination with the first aspect, the plurality of RARs comprise at least one of an initial transmission of one or more RARs of the plurality of RARs or a retransmission of one or more RARs of the plurality of RARs. In a third aspect, alone or in combination with one or more of the first and second aspects, process 500 includes receiving, from the BS, an indication of a transmission timing for the msgB communication; and identifying the msgB communication based at least in part on the indication of the transmission timing for the msgB communication in the supplementary scheduling information multiplexed with RARs.

In a fourth aspect, alone or in combination with one or more of the first through third aspects, process 500 includes receiving the indication of the transmission timing for the msgB communication in another msgB communication that is transmitted prior to the msgB communication. In a fifth aspect, alone or in combination with one or more of the first through fourth aspects, process 500 includes identifying the indication of the transmission timing for the msgB communication in at least one of DCI of the other msgB communication, a MAC sub-header of the other msgB communication, or a MAC sub-protocol data unit of the other msgB communication.

In a sixth aspect, alone or in combination with one or more of the first through fifth aspects, the indication of the transmission timing for the msgB communication comprises at least one of a respective compressed UE identifier associated with each of the one or more UEs, a timing offset, relative to the other msgB communication, of a control resource set or search space associated with the msgB communication, or an index of the search space associated with the msgB communication.

In a seventh aspect, alone or in combination with one or more of the first through sixth aspects, the respective compressed UE identifier associated with each of the one or more UEs comprises a random access preamble identifier, an MSB of a C-RNTI, an LSB of the C-RNTI, an MSB of an I-RNTI, or an LSB of the I-RNTI, and wherein the timing offset comprises at least one of a slot level offset, a symbol level offset, or a back off indicator. In an eighth aspect, alone or in combination with one or more of the first through seventh aspects, process 500 includes identifying one or more PUCCH parameters for HARQ feedback and transmitting, to the BS, HARQ feedback associated with the msgB communication based at least in part on the one or more PUCCH parameters.

In a ninth aspect, alone or in combination with one or more of the first through eighth aspects, the one or more PUCCH parameters comprise at least one of one or more common PUCCH parameters or one or more UE-specific PUCCH parameters.

In a tenth aspect, alone or in combination with one or more of the first through ninth aspects, the one or more PUCCH parameters comprise at least one of a PUCCH power control parameter, a PUCCH resource allocation, a PDSCH-to-HARQ feedback timing indicator, or a HARQ feedback timing indicator. In an eleventh aspect, alone or in combination with one or more of the first through tenth aspects, the one or more common PUCCH parameters are included in at least one of DCI included in a PDCCH portion of the msgB communication, a common MAC sub-header included in a PDSCH portion of the msgB communication, or a common MAC sub-PDU included in the PDSCH portion of the msgB communication, and the one or more UE-specific PUCCH parameters are included in at least one of a UE-specific MAC sub-header included in the PDSCH portion of the msgB communication or a UE-specific MAC sub-PDU included in the PDSCH portion of the msgB communication. The UE specific PUCCH parameters can also be derived from an implicit indication based on the ordering of MAC sub-header, the ordering of MAC sub-PDU, the preamble sequence index, the DMRS resource index, and the PUSCH resource unit index used by the UE in the two-step random access procedure.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A base station (BS) for wireless communication, comprising:
   one or more memories; and
   one or more processors, coupled to the one or more memories, configured to cause the BS to:
      transmit, to a plurality of user equipment (UEs), a first message B (msgB) communication, the first msgB communication including:
         an indication that a plurality of random access channel responses (RARs) directed to the plurality of UEs are included in a second msgB communication, and
         supplementary scheduling information for other RARs;
      group and selectively multiplex the plurality of RARs in the second msgB communication; and
      transmit the second msgB communication to the plurality of UEs, the second msgB communication being transmitted after the first msgB communication.

2. The BS of claim 1, wherein the one or more processors, to cause the BS to group and selectively multiplex the plurality of RARs in the second msgB communication, are configured to cause the BS to:
   group the plurality of RARs into a plurality of sets of RARs; and
   map different sets of RARs, of the plurality of sets of RARs to different time occasions within an RAR time window associated with a plurality of msgB communications, the second msgB communication being included in the plurality of msgB communications.

3. The BS of claim 2, wherein a first set of RARs, of the plurality of sets of RARs, is transmitted during an earlier portion of the RAR time window relative to a portion of the RAR time window in which a second set of RARs is transmitted, and
   wherein transmitting the first set of RARs during the earlier portion of the RAR time window triggers a prioritized retransmission of a message A (msgA) communication associated with the first set of RARs.

4. The BS of claim 2, wherein the one or more processors are further configured to cause the BS to:
   scramble the plurality of msgB communications using a same msgB radio network temporary identifier or using a same set of msgB radio network temporary identifiers mapped to a same random access occasion (RO).

5. The BS of claim 1, wherein the second msgB communication is transmitted during a first portion of an RAR time window, and
   wherein transmitting the second msgB communication during the first portion of the RAR time window triggers a prioritized retransmission of a message A (msgA) communication.

6. The BS of claim 1, wherein the one or more processors are further configured to cause the BS to:
   transmit, to the plurality of UEs, an indication of a transmission timing for the second msgB communication in the supplementary scheduling information for other RARs to be mapped to a different msgB communication.

7. The BS of claim 1, wherein the plurality of RARs comprise at least one of:
one or more fallback RARs,
one or more success RARs with an associated radio resource control (RRC) message, or
one or more success RARs without an RRC message.

8. The BS of claim 1, wherein the plurality of RARs comprise at least one of:
an initial transmission of one or more RARs of the plurality of RARs, or
a retransmission of one or more RARs of the plurality of RARs.

9. The BS of claim 1, wherein the one or more processors, to cause the BS to group and selectively multiplexing the plurality of RARs in the second msgB communication, are configured to cause the BS to:
multiplex the plurality of RARs in the second msgB communication based at least in part on at least one of:
a starting symbol of a respective RAR reception window associated with each of the plurality of UEs sharing a same random access occasion,
a respective priority associated with each of the plurality of RARs,
a respective quality of service (QOS) class associated with each of the plurality of RARs, or
a respective payload size of each of the plurality of RARs.

10. The BS of claim 1, wherein the second msgB communication identifies one or more physical uplink control channel (PUCCH) parameters for hybrid automatic repeat request (HARQ) feedback associated with the msgB communication,
wherein the one or more PUCCH parameters comprise at least one of:
one or more common PUCCH parameters, or
one or more UE-specific PUCCH parameters.

11. The BS of claim 10, wherein the one or more PUCCH parameters comprise at least one of:
a PUCCH power control parameter,
a physical downlink shared channel (PDSCH)-to-HARQ feedback timing indicator,
a PUCCH resource allocation, or
a HARQ feedback timing indicator.

12. The BS of claim 10, wherein the one or more common PUCCH parameters are included in at least one of:
downlink control information included in a physical downlink control channel portion of the second msgB communication,
a common medium access control (MAC) sub-header included in a physical downlink shared channel (PDSCH) portion of the second msgB communication, or
a common MAC sub-protocol data unit (PDU) included in the PDSCH portion of the second msgB communication; and
wherein the one or more PUCCH parameters include the one or more UE-specific PUCCH parameters and the one or more UE-specific PUCCH parameters are included in at least one of:
a UE-specific MAC sub-header included in the PDSCH portion of the second msgB communication,
a UE-specific MAC sub-PDU included in the PDSCH portion of the second msgB communication, or
an implicit indication based on an ordering of UE-specific MAC sub-header or UE-specific MAC sub-PDU, a preamble sequence index, a demodulation reference signal (DMRS) resource index, or a physical uplink shared channel (PUSCH) resource unit index used in a two-step random access procedure.

13. A method of wireless communication performed by a base station (BS), comprising:
transmitting, to a plurality of user equipment (UEs), a first message B (msgB) communication, the first msgB communication including:
an indication that a plurality of random access channel responses (RARs) directed to the plurality of UEs are included in a second msgB communication, and
supplementary scheduling information for other RARs;
grouping and selectively multiplexing the plurality of RARs in the second msgB communication; and
transmitting the second msgB communication to the plurality of UEs, the second msgB communication being transmitted after the first msgB communication.

14. The method of claim 13, wherein grouping and selectively multiplexing the plurality of RARs in the second msgB communication comprises:
grouping the plurality of RARs into a plurality of sets of RARs; and
mapping different sets of RARs, of the plurality of sets of RARs to different time occasions within an RAR time window associated with a plurality of msgB communications, the second msgB communication being included in the plurality of msgB communications.

15. The method of claim 14, wherein a first set of RARs, of the plurality of sets of RARs, is transmitted during an earlier portion of the RAR time window relative to a portion of the RAR time window in which a second set of RARs is transmitted, and
wherein transmitting the first set of RARs during the earlier portion of the RAR time window triggers a prioritized retransmission of a message A (msgA) communication associated with the first set of RARs.

16. The method of claim 14, further comprising:
scrambling the plurality of msgB communications using a same msgB radio network temporary identifier or using a same set of msgB radio network temporary identifiers mapped to a same random access occasion (RO).

17. The method of claim 13, wherein the second msgB communication is transmitted during a first portion of an RAR time window, and
wherein transmitting the second msgB communication during the first portion of the RAR time window triggers a prioritized retransmission of a message A (msgA) communication.

18. The method of claim 13, further comprising:
transmitting, to the plurality of UEs, an indication of a transmission timing for the second msgB communication in the supplementary scheduling information for other RARs to be mapped to a different msgB communication.

19. The method of claim 13, wherein the plurality of RARs comprise at least one of:
one or more fallback RARs,
one or more success RARs with an associated radio resource control (RRC) message, or
one or more success RARs without an RRC message.

20. The method of claim 13, wherein the plurality of RARs comprise at least one of:
an initial transmission of one or more RARs of the plurality of RARs, or a retransmission of one or more RARs of the plurality of RARs.

21. The method of claim 13, wherein grouping and selectively multiplexing the plurality of RARs in the second msgB communication comprises:
multiplexing the plurality of RARs in the second msgB communication based at least in part on at least one of:
a starting symbol of a respective RAR reception window associated with each of the plurality of UEs sharing a same random access occasion,
a respective priority associated with each of the plurality of RARs,
a respective quality of service (QOS) class associated with each of the plurality of RARs, or
a respective payload size of each of the plurality of RARs.

22. The method of claim 13, wherein the second msgB communication identifies one or more physical uplink control channel (PUCCH) parameters for hybrid automatic repeat request (HARQ) feedback associated with the msgB communication,
wherein the one or more PUCCH parameters comprise at least one of:
one or more common PUCCH parameters, or
one or more UE-specific PUCCH parameters.

23. The method of claim 22, wherein the one or more PUCCH parameters comprise at least one of:
a PUCCH power control parameter,
a physical downlink shared channel (PDSCH)-to-HARQ feedback timing indicator,
a PUCCH resource allocation, or
a HARQ feedback timing indicator.

24. The method of claim 22, wherein the one or more common PUCCH parameters are included in at least one of:
downlink control information included in a physical downlink control channel portion of the second msgB communication,
a common medium access control (MAC) sub-header included in a physical downlink shared channel (PDSCH) portion of the second msgB communication, or
a common MAC sub-protocol data unit (PDU) included in the PDSCH portion of the second msgB communication; and
wherein the one or more PUCCH parameters include the one or more UE-specific PUCCH parameters and the one or more UE-specific PUCCH parameters are included in at least one of:
a UE-specific MAC sub-header included in the PDSCH portion of the second msgB communication,
a UE-specific MAC sub-PDU included in the PDSCH portion of the second msgB communication, or
an implicit indication based on an ordering of UE-specific MAC sub-header or UE-specific MAC sub-PDU, a preamble sequence index, a demodulation reference signal (DMRS) resource index, or a physical uplink shared channel (PUSCH) resource unit index used in a two-step random access procedure.

25. A non-transitory computer-readable medium storing a set of instructions for wireless communication, the set of instructions comprising:
one or more instructions that, when executed by one or more processors of a base station (BS), cause the BS to:
transmit, to a plurality of user equipment (UEs), a first message B (msgB) communication, the first msgB communication including:
an indication that a plurality of random access channel responses (RARs) directed to the plurality of UEs are included in a second msgB communication, and
supplementary scheduling information for other RARs;
group and selectively multiplex the plurality of RARs in the second msgB communication; and
transmit the second msgB communication to the plurality of UEs, the second msgB communication being transmitted after the first msgB communication.

26. The non-transitory computer-readable medium of claim 25, wherein the one or more instructions, that cause the BS to group and selectively multiplex the plurality of RARs in the second msgB communication, cause the BS to:
group the plurality of RARs into a plurality of sets of RARs; and
map different sets of RARs, of the plurality of sets of RARs to different time occasions within an RAR time window associated with a plurality of msgB communications, the second msgB communication being included in the plurality of msgB communications.

27. The non-transitory computer-readable medium of claim 26, wherein a first set of RARs, of the plurality of sets of RARs, is transmitted during an earlier portion of an RAR time window relative to a portion of the RAR time window in which a second set of RARs is transmitted, and
wherein transmitting the first set of RARs during the earlier portion of the RAR time window triggers a prioritized retransmission of a message A (msgA) communication associated with the first set of RARs.

28. The non-transitory computer-readable medium of claim 26, wherein the one or more instructions further cause the BS to:
scramble the plurality of msgB communications using a same msgB radio network temporary identifier or using a same set of msgB radio network temporary identifiers mapped to a same random access occasion (RO).

29. The non-transitory computer-readable medium of claim 25, wherein the second msgB communication is transmitted during a first portion of an RAR time window, and
wherein transmitting the second msgB communication during the first portion of the RAR time window triggers a prioritized retransmission of a message A (msgA) communication.

30. An apparatus for wireless communication, comprising:
means for transmitting, to a plurality of user equipment (UEs), a first message B (msgB) communication, the first msgB communication including:
an indication that a plurality of random access channel responses (RARs) directed to the plurality of UEs are included in a second msgB communication, and
supplementary scheduling information for other RARs;
means for grouping and selectively multiplexing the plurality of RARs in the second msgB communication; and
means for transmitting the second msgB communication to the plurality of UEs, the second msgB communication being transmitted after the first msgB communication.

* * * * *